United States Patent
McEwan et al.

(10) Patent No.: US 8,600,238 B2
(45) Date of Patent: *Dec. 3, 2013

(54) METHOD AND SYSTEM FOR BI-DIRECTIONAL COMMUNICATION OVER A SINGLE OPTICAL FIBER

(75) Inventors: John A. McEwan, Dulles, VA (US); James S. McEwan, Dulles, VA (US)

(73) Assignee: Technology Advancement Group, Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/906,513

(22) Filed: Oct. 18, 2010

(65) Prior Publication Data

US 2011/0200329 A1 Aug. 18, 2011

Related U.S. Application Data

(63) Continuation-in-part of application No. 11/262,824, filed on Nov. 1, 2005, now Pat. No. 7,840,138.

(51) Int. Cl.
 *H04B 10/00* (2013.01)
(52) U.S. Cl.
 USPC ............... 398/138; 398/139; 398/79; 398/82
(58) Field of Classification Search
 USPC ......... 398/79, 43, 82, 95, 135, 138, 139, 128, 398/130
 See application file for complete search history.

(56) References Cited

U.S. PATENT DOCUMENTS

| | | | |
|---|---|---|---|
| 5,452,124 A | 9/1995 | Baker | |
| 5,633,741 A | 5/1997 | Giles | |
| 5,742,416 A | 4/1998 | Mizrahi | |
| 5,812,306 A | 9/1998 | Mizrahi | |
| 5,909,294 A | 6/1999 | Doerr et al. | |
| 6,130,775 A | 10/2000 | Yang | |
| 6,211,978 B1 | 4/2001 | Wojunik | |
| 6,529,301 B1 * | 3/2003 | Wang | 398/82 |
| 6,980,743 B1 * | 12/2005 | Greene | 398/92 |
| 7,466,921 B2 * | 12/2008 | Haishima | 398/83 |
| 7,840,138 B2 * | 11/2010 | McEwan et al. | 398/135 |
| 2001/0038477 A1 | 11/2001 | Hwang | |
| 2001/0038478 A1 | 11/2001 | Hwang | |
| 2002/0048067 A1 * | 4/2002 | Handelman et al. | 359/139 |
| 2007/0019956 A1 * | 1/2007 | Sorin et al. | 398/71 |

OTHER PUBLICATIONS

Shien-Kuei Liaw, et al.; "Multichannel Bidirectional Transmission Using a WDM MUX/DMUX Pair and Unidirectional In-Line Amplifiers", IEEE Photonics Technology Letters, vol. 9, Nov. 12, Dec. 1997, pp. 1664-1666.

* cited by examiner

*Primary Examiner* — M. R. Sedighian
(74) *Attorney, Agent, or Firm* — Nixon Peabody LLP

(57) ABSTRACT

Gigabit Ethernet connectivity is realized using off-the-shelf GIGABIT INTERFACE CONVERTER transceivers, wave division multiplexer/demultiplexers, and a single optical fiber. Simultaneous and bi-directional optical communication over a single optical fiber connecting two or more nodes is achieved by using at least one GIGABIT INTERFACE CONVERTER transceiver having at least one optical signal output and an optical signal input that are of different wavelengths from each other.

11 Claims, 4 Drawing Sheets

METHOD AND SYSTEM FOR BI-DIRECTIONAL COMMUNICATION OVER A SINGLE OPTICAL FIBER

CROSS-REFERENCE TO RELATED APPLICATIONS

This application is a continuation-in-part of U.S. patent application Ser. No. 11/262,824, titled "Method And System For Bi-Directional Communication Over A Single Optical Fiber," and filed on Nov. 1, 2005, now U.S. Pat. No. 7,840,138, which is incorporated by reference in its entirety.

FIELD OF THE INVENTION

The present invention relates to a system and method for providing optical Ethernet connectivity. Particularly, the present invention is concerned with providing Gigabit Ethernet connectivity using Wave Division Mulitplex communication over a single optical fiber.

BACKGROUND OF THE INVENTION

In recent years, local area network (LAN) applications have become more and more prevalent as a means for providing communications between personal computers, work stations and servers. Because of the breadth of its installed base, the 10BASE-T implementation of Ethernet remains the most pervasive, if not the dominant, network technology for LANs. However, as the need to exchange information becomes more and more imperative, and as the scope and file size of the information being exchanged increases, higher and higher communication speeds (i.e., greater bandwidth) are required from network interconnect technologies. Among the high-speed LAN technologies currently available, fast Ethernet, commonly termed 100BASE-T, has emerged as the clear technological choice. Fast Ethernet technology provides a smooth, non-disruptive evolution from the 10 megabit per second (Mbps) performance of 10BASE-T applications to the 100 Mbps performance of 100BASE-T. The growing use of 100BASE-T interconnections between servers and desktop personal computers is creating a definite need for an even higher speed network technology at the backbone and server level.

In an attempt to address the need for faster data communications, various groups have developed standards that specify high speed data transfers between components of data communication systems. For example IEEE standards 802.3ab and 802.3z define Ethernet systems for transferring data at rates up to one gigabit per second (1 Gbit/s). IEEE standard 802.3ae defines an Ethernet system for transferring data at rates up to 10 Gbits/s. These standards are now utilized in Gigabit Ethernet or 1000Base-T interconnections.

With the advent of Gigabit Ethernet or 1000Base-T interconnections, Gigabit Interface Converters (GIGABIT INTERFACE CONVERTER) are becoming increasingly popular for providing 1000BASE-T connectivity. GIGABIT INTERFACE CONVERTERs conform to well-defined specifications and operate by the standards set by the above-mentioned IEEE standards, as well as non-IEEE standards, such as Gigabit Media Independent Interface (GMII) or Extended Gigabit Media Independent Interface (EGMII). Also, GIGABIT INTERFACE CONVERTERs have become readily available as off-the-shelf components that make the design and implementation of a Gigabit Ethernet network or backbone relatively simple and economical.

The GIGABIT INTERFACE CONVERTER specification was developed by a group of electronics manufactures in order to arrive at a standard small form factor transceiver module for use with a wide variety of serial transmission media and connectors. The specification defines the electronic, electrical, and physical interface of a removable serial transceiver module designed to operate at Gigabit speeds. A GIGABIT INTERFACE CONVERTER provides a small form factor pluggable module which may be inserted and removed from a host or switch chassis without powering off the receiving socket. The GIGABIT INTERFACE CONVERTER standard allows a single standard interface to be changed from a first serial medium to an alternate serial medium by simply removing a first GIGABIT INTERFACE CONVERTER module and plugging in a second GIGABIT INTERFACE CONVERTER module having the desired alternate media interface.

The GIGABIT INTERFACE CONVERTER standard can provide communications over copper wire or optical fibers. GIGABIT INTERFACE CONVERTER allows network managers to configure each gigabit port on a port-by-port basis for short-wave (SX), long-wave (LX), long-haul (LH), and copper (CX) physical interfaces. LH GIGABIT INTERFACE CONVERTERs extend the single-mode fiber distance from the standard 5 km to 10 km. In addition to single-mode fiber, multi-mode fiber is also utilized as a medium for optical data transmission in a 1000Base-T network.

As schematically illustrated in FIG. 1, in a full-duplex 1000Base-T configuration 1 using GIGABIT INTERFACE CONVERTERs 2 and 3, two separate optical fibers 4 and 5 are needed to achieve simultaneous data transmission in two directions between two stations on a point-to-point link. A first optical fiber 5 carries optical signals from node A to node B in a first direction, and a second optical fiber 4 carries optical signals from node B to node A in a second direction, opposite to the first direction. Such a configuration is schematically illustrated in FIG. 1. In another configuration, an optical communication pipe, not shown, is created by bundling a plurality of optical fiber pairs. A plurality of GIGABIT INTERFACE CONVERTER transceivers can be trunked together with multiple pairs of optical fiber to create a high band-width pipe. Such a configuration may be of an array 2-channel, 4-channel, or 8-channel of GIGABIT INTERFACE CONVERTER transceivers trunked together.

At the present time, a Hewlett Packard™ GIGABIT INTERFACE CONVERTER with 1.25 Gbps transmission speed can be purchased for about $126, and a 3COM™ 1000BASE-LX GIGABIT INTERFACE CONVERTER can be purchased for $1,020.00. As for the optical transmission medium, the connection of various nodes in a network are usually owned by communications companies such as Sprint™, AT&T™, and the like. Since it is prohibitively expensive to create a fiber optic network infrastructure from the ground up, most companies needing fiber optic connections for their network find it most practical to lease fiber optic lines.

Leasing costs are generally based on the number of fibers needed and the distance through which optical data are to be transmitted. For example, a 15-mile single-fiber connection lease may cost about $1 million for 5 years in the United States. As noted above, existing standards and technology require that GIGABIT INTERFACE CONVERTER ethernet connectivity use a minimum of two fibers for full-duplex optical communication. Thus, at least two optical fibers must be leased for a minimum configuration of Gigabit Ethernet using GIGABIT INTERFACE CONVERTERs.

When Asynchronous Transfer Mode (ATM) or cell relay communication is commonly used as the backbone or core of communications networks, it is known to utilize methods and apparatus for full-duplex bi-directional long-haul communication using a single optical fiber using Wave Division Multiplexing (WDM) and laser-based transceivers.

As an example, U.S. Pat. No. 5,452,124 to Baker discloses a four-port WDM filter and a single erbium-doped optical amplifier to implement a dual wavelength bi-directional single fiber optical amplifier module. Baker discusses conventional two-fiber transmission and its drawback, and introduces WDM technology and a single-fiber bi-directional communication system. The focus of Baker is, however, an optical line amplifier module for the single-fiber bi-directional communication system.

In another example, U.S. Pat. No. 6,211,978 to Wojtunik discloses a multichannel wave division multiplex system for simultaneous bi-direction transmission through a single optical fiber. Wojtunik teaches modulated light signals having the same wavelength traveling in opposite directions over a single fiber at the same time. In yet another example, U.S. Pat. No. 5,633,741 to Giles discloses multichannel optical fiber communications having bi-directional transmission with at least two WDM channels in opposite transmission directions in a single fiber. More WDM communication systems are disclosed in U.S. Pat. No. 5,909,294 to Doerr et al., U.S. Pat. No. 6,130,775 to Yang, U.S. 2001/0038478A1 and 2001/0038477A1 to Hwang, and Liaw et al.'s "Multichannel Bidirectional Transmission using a WDM/MUX/DMUX pair and Unidirectional In-Line Amplifiers" IEEE Photonics Technology Letters, Vol. 9, No. 12, December 1997.

These WDM communication systems, although varied in their design, are generally found in ATM communication systems, and require an extraordinarily high-cost investment in customized hardware and software. The cost for designing and implementing a WDM communication system, without the optical fiber, can be about a quarter of a million to several millions of dollars. Accordingly, single fiber bi-direction optical signal transmission currently is very expensive.

SUMMARY OF THE INVENTION

There is a need for an economical solution to reduce the number of optical fibers needed for full-duplex data transmission while maintaining the capacity, reliability and cost efficiency of GIGABIT INTERFACE CONVERTER.

There is also a need for an economical design and implementation of Gigabit Ethernet using the relatively inexpensive and readily available off-the-shelf hardware, such as GIGABIT INTERFACE CONVERTERs, and software in conjunction with WDM technology to minimize the number of optical fiber needed to achieve 1000Base-T connectivity for Local Area Networks (LANs), Campus Area Networks (CAN), Metro Area Networks (MANs), Wide Area Networks (WANs), and the like.

Therefore, it is an object of the present invention is to provide a method and apparatus for economical Gigabit Ethernet point-to-point, full-duplex and bi-directional connectivity using one optical fiber.

A first aspect of the present invention is a method created for bi-directional full duplex Gigabit Ethernet connectivity in a local area network using a single optical fiber for data communication, including: converting an electrical signal to be communicated in a first direction into an optical signal of a first wavelength to be communicated in the first direction using a standard Gigabit Interface Converter device having an optical output and an optical input operating at a first wavelength; converting the optical signal to an optical signal of a second wavelength to be communicated in the first direction; coupling the optical signal of a second wavelength on the single optical fiber for communicating in the first direction.

A second aspect of the invention is a system for Gigabit Ethernet connectivity including: a first node, including: one Gigabit Interface Converter having an optical output port and an optical input port operating at a first wavelength; a wavelength converter having an optical input port and an optical output port, wherein the input port of wavelength converter receives the optical signal of the first wavelength, and the output port of said wavelength converter provides a converted signal of a second wavelength; and a wave division multiplexer/demultiplexer coupled to the output port of the wavelength converter and to the optical input of the one Gigabit Interface Converter of the first node.

The second aspect of the invention further includes: a second node, including: one Gigabit Interface Converter an optical output port and an optical input port operating at a first wavelength; a wavelength converter having an optical input port and an optical output port, wherein the input port of wavelength converter receives the optical signal of the second wavelength, and the output port of the wavelength converter provides a converted signal of the first wavelength; a wave division multiplexer/demultiplexer coupled to the input port of the wavelength converter and to the optical output of the one Gigabit Interface Converter of the second node; and a single optical fiber coupled to the wave division multiplexer/demultiplexer of the first node and of the second node, wherein the single optical fiber provides a bi-direction transmission of optical signals between the first and second node.

Further aspects of the present invention will become readily apparent to those skilled in the art from the following detailed description, wherein a preferred embodiment of the invention is shown and described, simply by way of illustration. As will be realized, the present invention incorporates other and different embodiments, and can be modified in various respects without departing from the invention. Accordingly, the drawings and description are to be regarded as illustrative nature, and not as restrictive.

BRIEF DESCRIPTION OF THE DRAWING

Reference is made to the attached drawing, wherein elements having the same reference numeral designations represent like elements throughout, and wherein.

DETAILED DESCRIPTION

Figure 1:
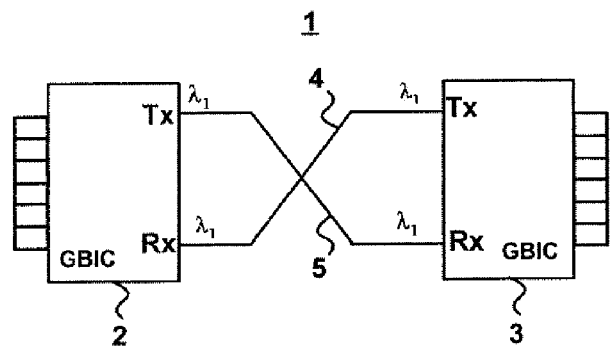
FIG. 1 is a schematic illustration of a conventional point-to-point Gigabit Ethernet between Node A and Node B using two optical fibers.

The preferred embodiment uses a novel combination of GIGABIT INTERFACE CONVERTERS and wave division multiplexer/demultiplexers coupled to a single optical fiber to provide full-duplex bi-directional transmission of optical signals in an Ethernet environment. As illustrated in FIG. 1 and described above, a conventional GIGABIT INTERFACE CONVERTER Ethernet system 1 commonly used today is shown with Node A comprising a GIGABIT INTERFACE CONVERTER transceiver 2 and Node B comprising a GIGABIT INTERFACE CONVERTER transceiver 3. Communication between Node A and Node B are accomplished via two optical fibers 4 and 5. In this conventional GIGABIT INTERFACE CONVERTER Ethernet system, GIGABIT INTERFACE CONVERTER transceiver 2 transmits, using a single-mode laser or a multi-mode LED, a light signal of a selected wavelength, and receives a transmitted light signal using an optical detector operated that the same wavelength.

As noted above, the conventional GIGABIT INTERFACE CONVERTER Ethernet system requires Node A to transmit a signal to Node B on optical fiber 5 and to receive transmitted signal from Node B on optical fiber 4. Hence, bi-directional full-duplex signal transmission requires two optical fibers regardless of the number of channels.

An off-the-shelf GIGABIT INTERFACE CONVERTER is illustrated in FIGS. 2A through 2D. Examples of GIGABIT INTERFACE CONVERTER transceivers having the form factor shown in FIGS. 2A through 2D are Finisar's shortwave FTR-8519-3 and FTR-8519-3-2.5, long-wave FTR-1319-3A and FTR-1319-5A30, and extended FTR-1519. At the time of this wilting writing, the GIGABIT INTERFACE CONVERTER transceiver FTR-1319 is priced at about $449.00, FTR-1519 at about $1826.00, FTR-8519-3 at about $115.00, and FTR-8519-3-2.5 at about $288.00, if purchased in single quantity.

Generally, each GIGABIT INTERFACE CONVERT ER transceiver having a transmitting channel and a receiving channel is considered as a 2-channel transceiver. The specification details of Finisar's GIGABIT INTERFACE CONVERTER are well known, as they are published and made available through Finisar. The FTR-8519-3 is a device having a shortwave laser operating at 850 nm multi-mode. The FTR-1319-5A-30 has a longwave laser of 1310 nm single-mode. The FTR-1519 has a longwave laser of 1550 nm single-mode.

Figure 2A:
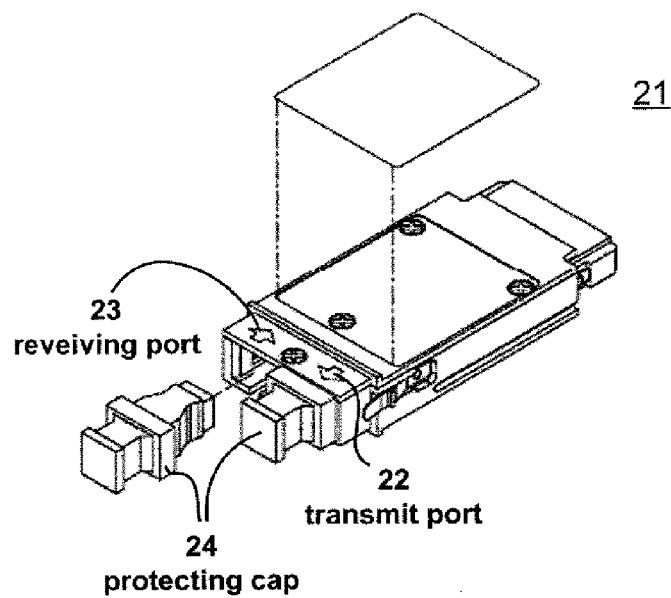
FIG. 2A is an exemplary perspective illustration of a GIGABIT INTERFACE CONVERTER.
Figure 2B:
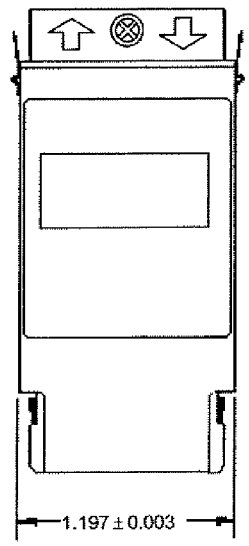
FIG. 2B is a top view of the GIGABIT INTERFACE CONVERTER of FIG. 2A.
Figure 2C:
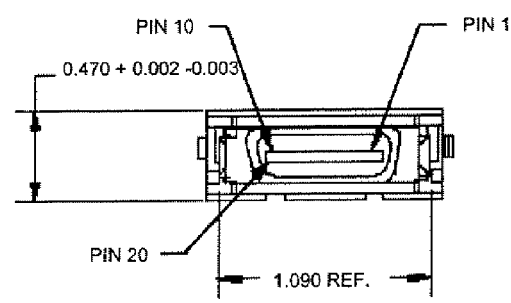
FIG. 2C is a back-end view of the GIGABIT INTERFACE CONVERTER FIG. 2A.
Figure 2D:
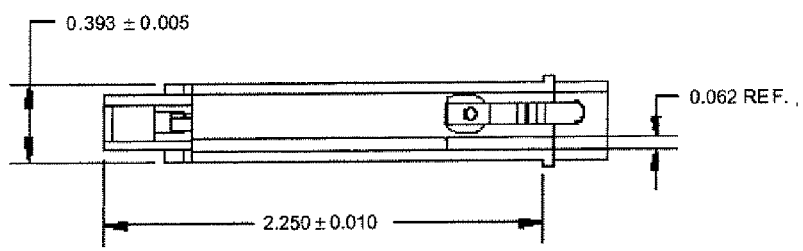
FIG. 2D is a side view of the GIGABIT INTERFACE CONVERTER of FIG. 2A.

As illustrated in FIG. 2A, GIGABIT INTERFACE CONVERTER 21 includes a single-mode long-wave laser transmitter that provides an optical signal output at transmit port 22. The optical signal output has a wavelength of 850 nm in the preferred embodiment. Also, a receiver includes an optical detector that detects optical signals having a wavelength of 850 nm at receiving port 23. Also shown in FIG. 2A are protecting caps 24, which are provided for the transmit port 24 and receiving port 23.

As discussed above, in a conventional GIGABIT INTERFACE CONVERTER Ethernet system, in order to utilize a common GIGABIT INTERFACE CONVERTER transceiver such as the FTR-8519-3-2.5, in an Ethernet network, two optical fibers are needed to separate the signal transmitted from port 22 and the signal received by receiving port 23. With a conventional GIGABIT INTERFACE CONVERTER, it is not possible to simultaneously transmit two signals of the same wavelength over a single optical fiber without creating signal interference from the signals of the same wavelength traveling in opposite directions.

Applicant has found that off-the-shelf GIGABIT INTERFACE CONVERTER transceivers can be modified in unconventional ways to realize Gigabit Ethernet connectivity using only one optical fiber for full-duplex bidirectional transmission of optical signals between two nodes in a point-to-point network.

Figure 6A:
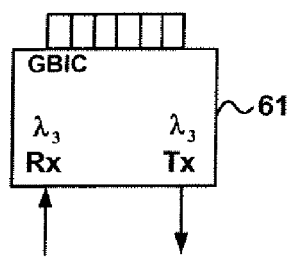
FIG. 6A is a schematic illustration of a conventional GIGABIT INTERFACE CONVERTER with a transmitter and a receiver operating at a same wavelength.
Figure 6B:
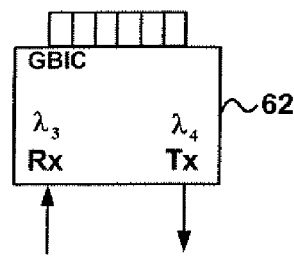
FIG. 6B is a schematic illustration of a GIGABIT INTERFACE CONVERTER of the preferred embodiment with a transmitter and a receiver operating at different wavelengths.

A conventional GIGABIT INTERFACE CONVERTER and Applicant's modified GIGABIT INTERFACE CONVERTER a are shown in FIGS. 6A and 6B, respectively. In FIG. 6A, a conventional GIGABIT INTERFACE CONVERTER transceiver 61 with a single wavelength, i.e. the transmitter and the receiver both operate at the same wavelength $\lambda_3$ is illustratively shown. In FIG. 6B, a modified GIGABIT INTERFACE CONVERTER transceiver 62 of the present invention with dual-wavelength capability, i.e. the transmitter operates at a wavelength $\lambda_3$ and the receiver operates at a different wavelength $\lambda_4$, is illustratively shown. To modify the GIGABIT INTERFACE CONVERTER of FIG. 6B, either the transmitter or the receiver is simply replaced with a different unit that operates at a different wavelength. Such a replacement or modification has no affects on the original functions of the GIGABIT INTERFACE CONVERTER. A fully functional system has been successfully implemented and is described below with respect to FIG. 3A.

Figure 3A:
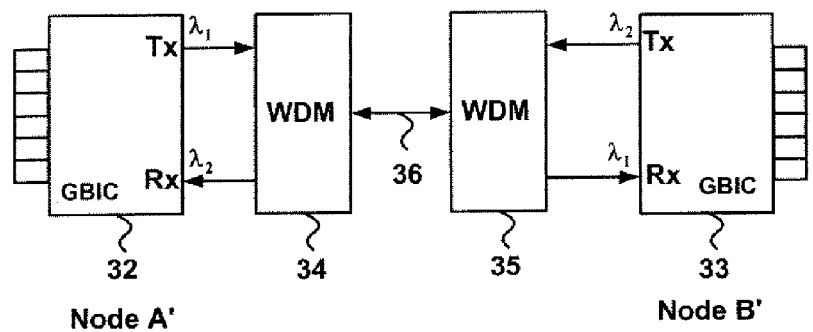
FIG. 3A is a schematic illustration point-to-point Gigabit Ethernet between Node A' and Node B' using single optical fiber in accordance with a preferred embodiment of the present invention.

Turning now to FIG. 3A, in a preferred embodiment of the present invention, at least a pair of conventional GIGABIT INTERFACE CONVERTER transceivers is modified to have a transmitter and a receiver operating at different wavelengths from each other. As illustrated in FIG. 3A, a Gigabit Ethernet connectivity system 31 is achieved using a pair of GIGABIT INTERFACE CONVERTER transceivers 32 and 33, wave division multiplexer and demultiplexer pair 34 and 35, and a single multi-mode optical fiber 36. Of course, for the sake of simplicity, details of the Gigabit Ethernet connectivity system 31 are omitted except for the key components illustrated schematically in FIG. 3A. For example, GIGABIT INTERFACE CONVERTER transceivers 32 and 33 are electronically and physically coupled to a host computer or to a chassis housing multiple GIGABIT INTERFACE CONVERTERs in a known manner.

In FIG. 3A, a first GIGABIT INTERFACE CONVERTER transceiver 32 at Node A' includes a transmitter having a laser generating optical signals of a first wavelength $\lambda_1$, and a receiver having an optical detector for detecting transmitted optical signals of a second wavelength $\lambda_2$. A second GIGABIT INTERFACE CONVERTER transceiver at Node B' includes a transmitter having a laser generating optical signals of the second wavelength $\lambda_2$, and a receiver having an optical detector for detecting transmitted optical signals of the first wavelength $\lambda_1$. Connected to the first GIGABIT INTERFACE CONVERTER transceiver 32 is a first wave division multiplexer and demultiplexer 34, and connected to the second GIGABIT INTERFACE CONVERTER transceiver is a second wave division multiplexer and demultiplexer 35. Such multiplexers and demultiplexers are well known to complete a connection between Node A' and Node B', a multi-mode optical fiber 36 is utilized to carry signals of the first wavelength $\lambda_1$ and of the second wavelength $\lambda_2$ respectively traveling in opposite directions simultaneously.

In order to have the transmitter and receiver of a standard GIGABIT INTERFACE CONVERTER operating at different wavelengths from each other, it is desirable, for example, to physically replace the transmitter of the first GIGABIT INTERFACE CONVERTER 32 with another type of transmitter having a laser generating optical signals of wavelength $\lambda_1$ while keeping the receiver having an optical detector detecting optical signals of wavelength $\lambda_2$. Of course, the second GIGABIT INTERFACE CONVERTER 33 is a complement of the first GIGABIT INTERFACE CONVERTER 32. That is, the receiver of GIGABIT INTERFACE CONVERTER 33 is replaced with a different type that is capable of detecting optical signals having a wavelength of $\lambda_1$.

The system illustrated in FIG. 3A can be implemented using, for example, a Finisar FTR-8519 GIGABIT INTERFACE CONVERTER transceiver and a Finisar FTR-1319 GIGABIT INTERFACE CONVERTER transceiver and swapping their transmitter or receiver. The FTR-8519 has a receiver and transmitter operating at 850 nm wavelength, and the FTR-1319 has a receiver and a transmitter operating at 1310 nm wavelength. After a swap, the modified FTR-1319 may have the FTR-8519's 850 nm transmitter, and the FTR-8519 may have the FTR-1319's 1310 nm transmitter.

By simply replacing the transmitter or the receiver, an inexpensive GIGABIT INTERFACE CONVERTER transceiver can operate at dual wavelengths as shown. The functionality of a GIGABIT INTERFACE CONVERTER transceiver of the preferred embodiment having dual wavelength characteristic is no different than that of the conventional GIGABIT INTERFACE CONVERTER having a single wavelength characteristic. In other words, no firmware or software modification is necessary to operate the GIGABIT INTERFACE CONVERTERs 32 and 33 in the exemplary system of FIG. 3A.

In the system of FIG. 3A, the wave division multiplexers/demultiplexers (WDM) 34 and 35 can also be off-the-shelf components. The optical fiber connecting the multiplexer/demultiplexer 34 and 35 can be a multi-mode fiber.

Figure 4:
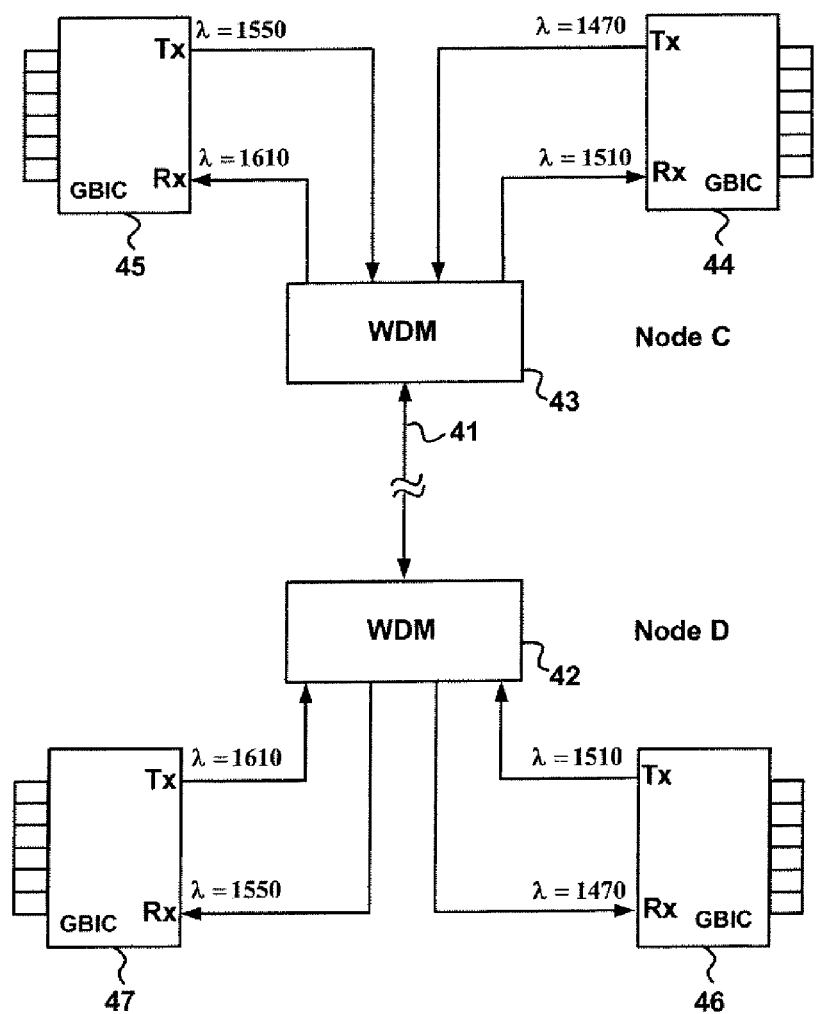
FIG. 4 is a schematic illustration of another embodiment of a GIGABIT INTERFACE CONVERTER Ethernet system using WDM and a single optical fiber of the present invention.

Of course, the number of channels in a Gigabit Ethernet connectivity using GIGABIT INTERFACE CONVERTER transceivers, wave division multiplexer/demultiplexers and a single fiber optic of the present invention is not necessarily limited to a 2-channel system as illustrated in FIG. 3A. Alternatively, a 4-channel system is shown in FIG. 4. The number of channels can be expanded even further while utilizing only one optical fiber to carry data that are simultaneously and bi-directionally transmitted. Naturally, each channel in such a system should operate at a wavelength that is different from the remaining channels in order to take advantage of the wavelength division multiplexing and demultiplexing technique.

In FIG. 4, GIGABIT INTERFACE CONVERTER transceivers 44 and 45 and wave division multiplexer/demultiplexer 43 constitute Node C. Further, GIGABIT INTERFACE CONVERTER transceivers 46 and 47 and wave division multiplexer/demultiplexer 42 constitute Node D. Node C and Node D are linked by a single optical fiber 41.

At Node C, GIGABIT INTERFACE CONVERTER transceiver 44 may have transmitter having a 1470 nm laser output and a receiver having an optical detector for a 1510 nm optical signal, and GIGABIT INTERFACE CONVERTER transceiver 45 may have a transmitter having a 1550 nm laser output and a receiver having an optical detector for 1610 nm optical signal. Other types of transmitters and receivers can be utilized.

At Node D, GIGABIT INTERFACE CONVERTER transceiver 46 may have transmitter having a 1510 nm laser output and a receiver having an optical detector for 1470 nm optical signal, and GIGABIT INTERFACE CONVERTER transceiver 47 may have transmitter having a 1610 nm laser output and a receiver having an optical detector for a 1550 nm optical signal. The wavelength of each channel shown in FIG. 4 is for illustrative purposes. Other wavelengths may be used, as GIGABIT INTERFACE CONVERTER transceivers are manufactured with a wide range of single-mode lasers operating at a variety of wavelengths, as noted above. Similar to the embodiment shown in FIG. 3A, the GIGABIT INTERFACE CONVERTER transceivers 44, 45, 46, and 47 are dual-wavelength GIGABIT INTERFACE CONVERTER transceivers. That is each GIGABIT INTERFACE CONVERTER transceiver has a transmitter and a receiver that operate at a different wavelength.

Figure 3B:
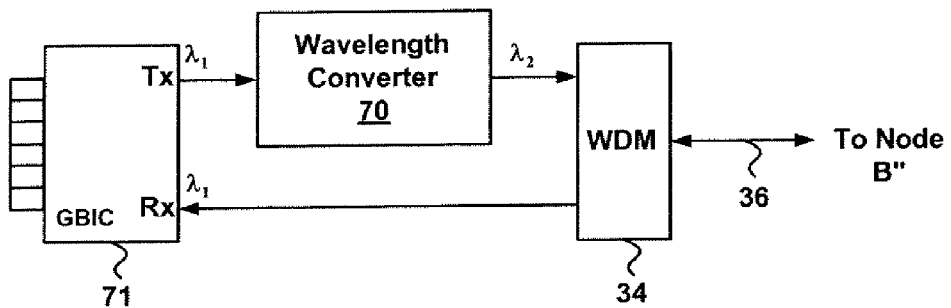
FIG. 3B is a schematic illustration of another embodiment using a wavelength converter.
Figure 3C:
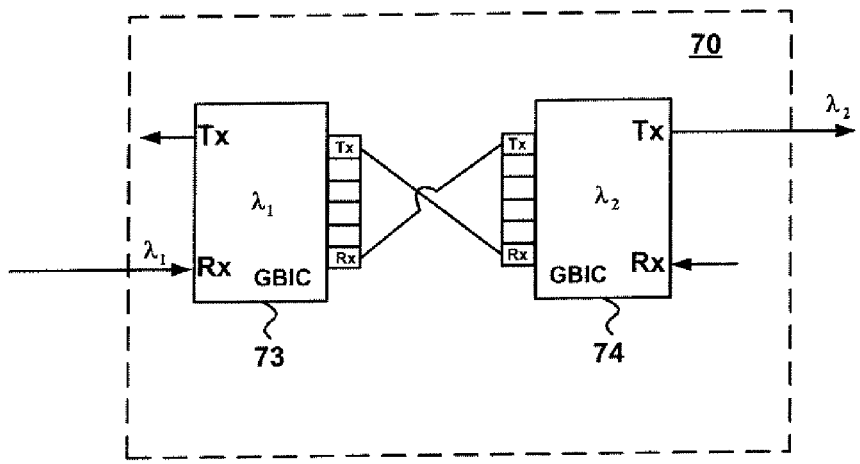
FIG. 3C is schematic illustration of a wavelength converter.

In another embodiment, as shown in FIGS. 3B and 3C, instead of swapping the transmitter to achieve a dual-wavelength capability as shown in FIG. 3A, a wavelength converter 70 is utilized to convert a optical signal of a first wavelength $\lambda_1$ which is to be transmitted in a first direction, to a second wavelength $\lambda_2$ to be transmitted in the first direction.

FIG. 3B shows a GIGABIT INTERFACE CONVERTER 71 having a receiver and transmitter operating at a first wavelength $\lambda_1$. An optical signal from GIGABIT INTERFACE CONVERTER 71 at Node A" is transmitted to the wavelength converter 70 where the optical signal is converted into a second wavelength $\lambda_2$. The optical signal of the second wavelength $\lambda_2$ is then multiplexed via the WDM 34 and transmitted via the single optical fiber 36 to Node B".

FIG. 3C is a simplified but detailed drawing of a wavelength converter 70 showing only the key features to illustrate its function. Essentially, the wavelength converter includes two off-the-shelf GIGABIT INTERFACE CONVERTERS 73 and 74 electrically coupled to each other. The first wavelength $\lambda_1$ from GIGABIT INTERFACE CONVERTER 71 is received by the receiver of GIGABIT INTERFACE CONVERTER 73. The optical signal is converted to an interim electrical signal that is electrically coupled to GIGABIT INTERFACE CONVERTER 74, which converts the interim electrical signal to an optical of the second wavelength $\lambda_2$ that is to be transmitted from Node A" in the first direction.

A similar arrangement is easily implemented to convert the optical signal of the second wavelength to an optical signal of the first wave length A at Node B". Using the same technique illustrated in FIG. 3C, an optical signal of a wavelength may be converted to any desirable wavelength.

In another embodiment, not illustrated, GIGABIT INTERFACE CONVERTER transceivers utilize an optical filter as a band-pass filter to select a specific desirable operating optical wavelength may be modified by swapping the optical filter of the receiver so that the optical filter of the receiver has a different operating wavelength than an optical filter in the transmitter. The swapping of the filter also provides the effect of dual-wavelength capability illustrated in FIG. 6B. Optical filters are found in inexpensive, short-haul GIGABIT INTERFACE CONVERTER transceivers that utilize LED as a light source in their transmitter.

Figure 5:
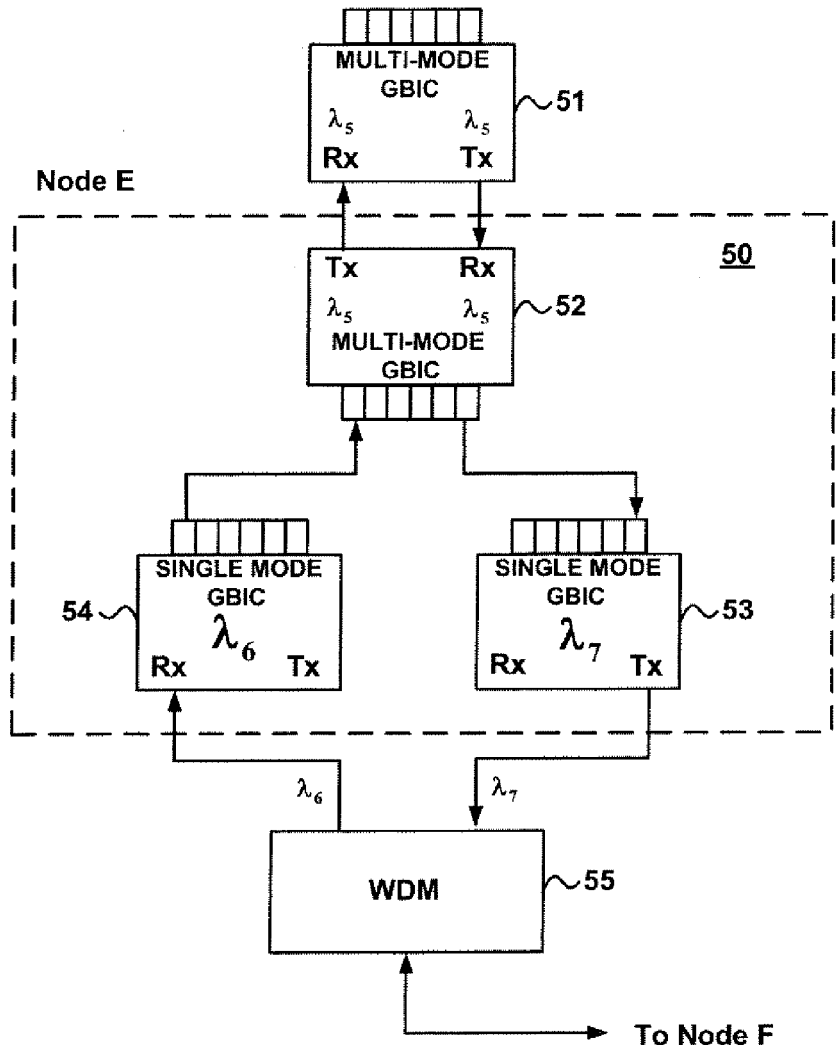
FIG. 5 is a schematic illustration of another embodiment of a GIGABIT INTERFACE CONVERTER Ethernet system using WDM and a single optical fiber of the present invention.

In yet another embodiment, as shown in FIG. 5, the effect of producing dual-wavelength transceivers is achieved by using three off-the-shelf GIGABIT INTERFACE CONVERTER transceivers to make a wavelength converter.

In FIG. 5, an illustration of a single Node E is shown with a single optical fiber long-haul connectivity to Node F. At node E, an inexpensive multi-mode GIGABIT INTERFACE CONVERTER transceiver 51 with short-haul capability is electrically coupled to a host computer, not shown, in a known manner. The multi-mode GIGABIT INTERFACE CONVERTER transceiver 51 can have a LED-type transmitter and a receiver having an optical detector. Both the receiver and transmitter of multi-mode GIGABIT INTERFACE CONVERTER transceiver 51 operate at a predetermined wavelength $\lambda_5$. Long-haul connectivity typically requires a GIGABIT INTERFACE CONVERTER with a longwave single-mode laser, and short-haul connectivity typically requires shortwave laser or multi-mode laser.

Optically coupled to the multi-mode GIGABIT INTERFACE CONVERTER transceiver 51 is a wave-length converter 50, as shown in the dotted box in FIG. 5, which comprises three GIGABIT INTERFACE CONVERTER transceivers 52, 53, and 54. The GIGABIT INTERFACE CONVERTER transceiver 52 is an inexpensive short-haul multi-mode GIGABIT INTERFACE CONVERTER and can be an optically coupled to the GIGABIT INTERFACE CONVERTER transceiver 51. In order to provide long-haul full-duplex single optical fiber connectivity to at least one other node using wave division multiplexing/demultiplex technique, GIGABIT INTERFACE CONVERTER transceivers 53 and 54, which can be long wave single mode transceivers, are preferably coupled to the short-haul multi-mode GIGABIT INTERFACE CONVERTER 52 electrically.

In the system of FIG. 5, optical signals transmitted from Node E to Node F are transmitted via the transmitter of the multi-mode GIGABIT INTERFACE CONVERTER transceiver 51, through the multi-mode GIGABIT INTERFACE CONVERTER transceiver 52 and the single-mode GIGABIT INTERFACE CONVERTER transceiver 54, at wavelength $\lambda_6$, and a wave division multiplex/demultiplexer 55. Optical signals are transmitted from Node E to Node F via the wave division multiplexer/demultiplexer 55, a receiver of the single-mode GIGABIT INTERFACE CONVERTER transceiver 53, operating at wavelength $\lambda_7$, through the multi-mode GIGABIT INTERFACE CONVERTER transceiver 52, and ultimately to the multi-mode GIGABIT INTERFACE CONVERTER transceiver 51.

The embodiment of the present invention illustrated in FIG. 5 does not require any swapping of a receiver component or a transmitter component as in the embodiment shown in FIG. 3A and FIG. 4 because converter 50 is used to convert the wavelengths. Further, a mix of inexpensive short-haul multi-mode GIGABIT INTERFACE CONVERTER transceivers and the more expensive long-haul single-mode GIGABIT INTERFACE CONVERTER transceiver can be implemented as discussed above to provide an economical full-duplex and bi-directional wave division multiplex communication over single optical fiber to each node. Also, as described above, single fiber communication can be accomplished to plural nodes. Of course, the distances between nodes are determined by the type of transmitter laser and the optical fiber used.

The present invention is a novel and simple application of GIGABIT INTERFACE CONVERTER transceivers permits to achieve full-duplex and bidirectional Gigabit Ethernet connectivity over one fiber. The invention can use standard "off the shelf" modules modified to operate at different wavelengths. The invention can be applied to apply communication between any devices. Further, the invention can be configured in various manners to achieve the desired communication. The wavelength conversion can be accomplished in any manner.

In the preferred embodiments, coupling/decoupling is accomplished by multiplexers/de-multiplexers, However, this function can be accomplished in any manner. Also, in the preferred embodiments, light for communication in one direction is changed in frequency. However, any attribute of the light can be changed so that light in one direction can be distinguished from light in another direction. For example amplitude or polarization can be changed.

It will be apparent that many modifications and variations may be effected without departing from the scope of the novel concepts of the present invention as defined by the appended claims and legal equivalents.

What is claimed is:

1. A method for bi-directional data connectivity over a single optical fiber, comprising:
   receiving, at a first Gigabit interface Converter, a first electrical signal to be communicated in a first direction, the first Gigabit Interface Converter including a transmitter and a receiver operating at a first wavelength;
   converting, using the first Gigabit interface Converter, the first electrical signal to a first optical signal of the first wavelength;
   communicating the first optical signal of the first wavelength from the transmitter of the first Gigabit Interface Converter to a first wavelength converter, the first wavelength converter including a second Gigabit interface Converter coupled to a third Gigabit Interface Converter, the second Gigabit Interface Converter including a receiver operating at the first wavelength, and the third Gigabit interface Converter includes a transmitter operating at a second wavelength, the second wavelength being different from the first wavelength;
   converting, using the first wavelength converter, the first optical signal from the first wavelength to the second wavelength; and
   coupling the first optical signal of the second wavelength to an optical fiber to transmit the first optical signal in the first direction.

2. The method according to claim 1, wherein the first optical signal is coupled to the optical fiber via a wavelength-division multiplexing/demultiplexing device.

3. The method according to claim 2, further comprising receiving, at the wavelength-division multiplexing/demultiplexing device, a second optical signal of the first wavelength transmitted from the optical fiber in a second direction; and
   communicating the second optical signal of the first wavelength-division multiplexing/demultiplexing device to the receiver of the first Gigabit Interface Converter.

4. The method according to claim 3, wherein the first optical signal and the second optical signal are transmitted simultaneously on the same optical fiber.

5. The method according to claim 1, wherein the converting using the first wavelength converter comprises:
   receiving, at the receiver of the second Gigabit Interface Converter, the first optical signal of the first wavelength from the transmitter of the first Gigabit interface Converter;
   converting, using the second Gigabit Interface Converter, the first optical signal to an interim electrical signal;
   communicating the interim electrical signal from the second Gigabit interface Converter to the third Gigabit Interface Converter;

converting, using the third Gigabit interface Converter, the electrical signal to the first optical signal of the second wavelength; and communicating, via the transmitter of the third Gigabit Interface Converter, the first optical signal of the second wavelength to a wavelength-division multiplexing/demultiplexing device.

6. The method according to claim 2, further comprising:
receiving, at the wavelength-division multiplexing/demultiplexing device, a second optical signal of a third wavelength transmitted from the optical fiber in a second direction;
communicating the second optical signal of the third wavelength from the wavelength-division multiplexing/demultiplexing device to the first wavelength converter;
converting, using the first wavelength converter, the second optical signal from the third wavelength to the first wavelength;
communicating the second optical signal of the first wavelength from the first wavelength converter to the receiver of the first Gigabit Interface Converter.

7. The method according to claim 6, wherein the first wavelength converter includes the second Gigabit interface Converter further coupled to a fourth Gigabit Interface Converter, the second Gigabit Interface Converter includes a transmitter operating at the first wavelength, the third Gigabit Interface Converter includes a receiver operating at the second wavelength, and the fourth Gigabit Interface Converter includes a transmitter and a receiver operating at the third wavelength.

8. A system for bi-directional data connectivity over a single optical fiber, comprising:
a first Gigabit Interface Converter configured to receive a first signal to be communicated in a first direction and convert the first signal from an electrical signal to an optical signal, the first Gigabit Interface Converter including a first transmitter and a first receiver respectively configured to transmit and receive optical signals of a first wavelength;
a first wavelength converter coupled to the first Gigabit Interface Converter, the first wavelength converter being configured to convert the first signal received from the transmitter of the first Gigabit Interface Converter from an optical signal of the first wavelength to an optical signal of the second wavelength, the first wavelength converter including a second Gigabit Interface Converter operable at the first wavelength and a third Gigabit Interface Converter operable at the second wavelength, the second Gigabit Interface Converter being coupled to the third Gigabit Interface Converter;
a first wavelength-division multiplexing/demultiplexing device coupled to the first wavelength converter; and
and optical fiber coupled to the first wave-division multiplexing/demultiplexing device, the first wavelength-division multiplexing/demultiplexing device being configured to couple the first signal of the second wavelength to the optical fiber to transmit the first signal in the first direction.

9. The system according to claim 8, wherein the first transmitter of the first Gigabit Interface Converter is coupled to the first wavelength converter and the first receiver of the first Gigabit Interface Converter is coupled to the first wavelength-division multiplexing/demultiplexing device.

10. The system according to claim 8, wherein the first transmitter and the first receiver of the first Gigabit Interface Converter are coupled to the first wavelength converter.

11. The system according to claim 10, wherein the first wavelength converter further includes a fourth Gigabit Interface Converter operable at a third wavelength, the second Gigabit Interface Converter being further couple to the fourth Gigabit Interface Converter.

* * * * *